(12) United States Patent
Blackson et al.

(10) Patent No.: US 7,959,077 B2
(45) Date of Patent: Jun. 14, 2011

(54) BANKING SYSTEM CONTROLLED RESPONSIVE TO DATA BEARING RECORDS

(75) Inventors: Dale H. Blackson, Canton, OH (US); James R. Church, Kent, OH (US); Mark D. Smith, North Canton, OH (US); Natarajan Ramachandran, Uniontown, OH (US)

(73) Assignee: Diebold, Incorporated, North Canton, OH (US)

( * ) Notice: Subject to any disclaimer, the term of this patent is extended or adjusted under 35 U.S.C. 154(b) by 224 days.

(21) Appl. No.: 12/321,759

(22) Filed: Jan. 23, 2009

(65) Prior Publication Data

US 2009/0194585 A1    Aug. 6, 2009

Related U.S. Application Data

(63) Continuation-in-part of application No. 09/776,503, filed on Feb. 2, 2001, now Pat. No. 7,483,859.

(60) Provisional application No. 60/250,269, filed on Nov. 30, 2000, provisional application No. 60/180,490, filed on Feb. 5, 2000.

(51) Int. Cl.
*G06F 7/08* (2006.01)
(52) U.S. Cl. ......... 235/381; 235/375; 235/379; 235/380
(58) Field of Classification Search .................. 235/375, 235/379, 380, 381
See application file for complete search history.

(56) References Cited

U.S. PATENT DOCUMENTS

| 4,179,723 | A |   | 12/1979 | Spencer |
|---|---|---|---|---|
| 4,359,631 | A | * | 11/1982 | Lockwood et al. ........... 235/381 |
| 4,900,903 | A | * | 2/1990 | Wright et al. ................. 235/380 |
| 5,191,573 | A | * | 3/1993 | Hair ................................ 369/84 |
| 5,239,480 | A | * | 8/1993 | Huegel .............................. 705/5 |
| 5,450,938 | A |   | 9/1995 | Rademacher |
| 5,636,276 | A | * | 6/1997 | Brugger .......................... 705/54 |
| 5,778,187 | A |   | 7/1998 | Monteiro et al. |
| 5,780,825 | A |   | 7/1998 | Sato et al. |
| 5,781,889 | A | * | 7/1998 | Martin et al. .................. 705/1.1 |
| 5,826,246 | A |   | 10/1998 | Bator et al. |
| 5,897,625 | A | * | 4/1999 | Gustin et al. .................... 705/43 |
| 5,930,765 | A | * | 7/1999 | Martin ....................... 705/14.12 |
| 5,987,439 | A | * | 11/1999 | Gustin et al. .................... 705/43 |
| 6,154,879 | A |   | 11/2000 | Pare, Jr. et al. |
| 6,189,783 | B1 |   | 2/2001 | Motomiya et al. |

(Continued)

FOREIGN PATENT DOCUMENTS

EP        0569816 A2    11/1993

(Continued)

*Primary Examiner* — Daniel A Hess
*Assistant Examiner* — Paultep Savusdiphol
(74) *Attorney, Agent, or Firm* — Ralph E. Jocke; Daniel D. Wasil; Walker & Jocke

(57) ABSTRACT

An automated banking machine operates responsive to data bearing records to carry out financial transactions. The automated banking machine includes a card reader that operates to read data from user cards that corresponds to financial accounts. The automated banking machine includes a display, at least one manual input device and a cash dispenser. The machine further includes at least one computer processor that operates to cause financial transactions to be carried out on accounts corresponding to the data read from cards. The automated banking machine computer processor is operative to also cause digital information to be delivered from the machine or sent to remote system addresses.

20 Claims, 3 Drawing Sheets

U.S. PATENT DOCUMENTS

| | | |
|---|---|---|
| 6,193,155 B1 | 2/2001 | Walker et al. |
| 6,199,754 B1 * | 3/2001 | Epstein .................. 235/379 |
| 6,308,887 B1 * | 10/2001 | Korman et al. ............ 235/379 |
| 6,381,626 B1 * | 4/2002 | De Leo et al. ............. 709/200 |
| 6,477,532 B1 | 11/2002 | Duliege |
| 6,625,472 B1 | 9/2003 | Farazmandnia et al. |
| 6,697,944 B1 * | 2/2004 | Jones et al. ............... 713/168 |
| 6,721,783 B1 * | 4/2004 | Blossman et al. .......... 709/206 |
| 6,748,539 B1 * | 6/2004 | Lotspiech ................. 726/20 |
| 2001/0054010 A1 * | 12/2001 | Bernabeo et al. .......... 705/26 |

FOREIGN PATENT DOCUMENTS

| | | |
|---|---|---|
| EP | 0854460 A2 | 7/1998 |
| GB | 2328532 A | 2/1999 |
| WO | WO 97/30425 A1 | 8/1997 |
| WO | WO 97/45796 A1 | 12/1997 |

\* cited by examiner

BANKING SYSTEM CONTROLLED RESPONSIVE TO DATA BEARING RECORDS

CROSS REFERENCE TO RELATED APPLICATIONS

This application is a continuation-in-part of U.S. patent application Ser. No. 09/776,503 filed Feb. 2, 2001. Ser. No. 09/776,503 claims benefit pursuant to 35 U.S.C. §119(e) of Provisional Application Ser. Nos. 60/180,490 filed Feb. 5, 2000 and 60/250,269 filed Nov. 30, 2000. The disclosures of each of these applications is incorporated herein by reference in its entirety.

TECHNICAL FIELD

This invention relates to automated banking machines that operate responsive to data read from data bearing records such as user cards and which may be classified in U.S. Class 235, Subclass 379.

BACKGROUND ART

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine which enables customers to carry out banking transactions. Banking transactions carried out may include the dispensing of cash, the making of deposits, the transfer of funds between accounts and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine or an ATM shall be deemed to include any machine that may be used to electronically carry out transactions involving transfers of value.

Automated banking machines may benefit from improvements.

OBJECTS OF EXEMPLARY EMBODIMENTS

It is an object of an exemplary embodiment to provide an automated banking machine that operates responsive to data bearing records.

It is an object of an exemplary embodiment to provide an automated banking machine that is operative to dispense digital information.

It is a further object of an exemplary embodiment to provide an automated banking machine that is operative to dispense digital information to a portable storage medium or device.

It is a further object of an exemplary embodiment to provide an automated banking machine that is operative to dispense digital information to a portable computing system.

It is a further object of an exemplary embodiment to provide an automated banking machine that is operative to dispense digital information in exchange for a user fee.

It is a further object of an exemplary embodiment to provide an automated banking machine that is operative to output digital information to an output device in exchange for a user fee.

It is a further object of an exemplary embodiment to provide an automated banking machine that is operative to distribute user fee income generated from the dispense of digital information among a plurality of entities.

It is a further object of an exemplary embodiment to provide an automated banking machine that is operative to download digital information from a digital information source located on a network.

It is a further object of an exemplary embodiment to provide an automated banking machine that is operative to play digital content.

It is a further object of an exemplary embodiment to provide an automated banking machine that is operative to dispense digital information onto a portable storage medium.

It is a further object of an exemplary embodiment to provide an automated banking machine that is operative to provide digital information to a remote system address responsive to a banking or other transaction at the machine.

It is a further object of an exemplary embodiment to provide an automated banking machine that is operative to offer a selection of digital content that are downloaded from a public network such as the Internet or a private network.

Further objects of exemplary embodiments will be made apparent in the following Detailed Description of Exemplary Embodiments and the appended claims.

The foregoing objects are accomplished in one exemplary embodiment by an automated banking machine that comprises an ATM that is operative to dispense digital information which is also referred to herein as digital content. In some exemplary embodiments the digital information includes digital sound recording files that may be output through an output device such as a sound system in operative connection with the ATM. However in alternative embodiments, the digital information may include other types of information that may be digitally stored and transported over a network. Other examples of digital information include digital representations of images, books, software, audiovisual works, movies, TV shows, magazines, newspapers, games, text, graphics, compilations, and databases.

The ATM is in operative connection with storage read/write devices such as a floppy disk drive, CD drive, DVD drive, smart card drive, flash memory drive, or any other device that is operative to read and write information to a portable storage medium. In the exemplary embodiment the ATM is operative to save digital information such as digital sound recording files to the portable medium.

Alternative embodiments of the ATM may include a portable computing device communication interface device which is alternatively referred to as a port that is operative to communicate with a portable computing device. When a portable computing device, such as a laptop computer, hand-held computer, cell phone, or sound file player is placed in operative connection with the communication port, the ATM is operative to send digital information such as digital sound recording files to the portable computing device. Examples of communication ports that are operative for use with some embodiments include a Universal Serial Bus (USB) port, parallel port, RS-232 Serial Port, Infrared (IR) Port, Radio Frequency (RF) port, or any other type of physical or wireless communication port.

The exemplary ATM is operatively programmed to accept a fee from a user in exchange for outputting either digital information or saving digital information to a portable storage medium or portable computing device. For ATMs that include a card reader and are in operative connection with a host banking system, the ATM may be operative to charge the fee to an account associated with a credit card, debit card, or smart card for example. For ATMs that include a currency accepting device, the ATM may be operative to accept currency in exchange for outputting or saving digital information.

In an exemplary embodiment, the ATM is in operative connection with a private network or public network such as the Internet. The ATM is programmed to enable a user of the ATM to view and select digital information that is downloaded across the network. For example the ATM is operative to display visual outputs corresponding to a plurality of sound recording files such as MP3 files, that can be executed to reproduce individual musical performances such as songs. The ATM is further operative to download one or more of these sound files in exchange for a fee and to either play the song through a sound system or send the song to a portable storage medium or computing device.

In an alternative form, the ATM may be operative to periodically download a selection of digital information in response to programmed instructions to acquire one or more categories of digital information. By pre-downloading and storing digital information, the ATM does not need to be continually connected to a source of digital information. Also any delay caused by having to download individually selected information files across a network is eliminated because the files are stored locally in the ATM.

For example when the digital information corresponds to sound recording files, the ATM may be operative to periodically download sound files that correspond to the most popular songs for the week or other time period. In another example if the digital information corresponds to digital books, the ATM may be operative to periodically download digital books that correspond to a fiction or nonfiction best seller list or ranking. In another example if the digital information corresponds to broadcast TV shows, the ATM may be operative to periodically download digital files that correspond to the TV shows that were broadcast over a certain time period. Other examples of digital information may include movies, financial analysis, conventional materials, discount coupons, promotional offers or other content. Of course in other embodiments other types of digital information may be delivered and stored in the machine for delivery to users, or downloaded at the time in response to the user's request.

In an exemplary embodiment, the ATM may be operative to distribute the user fees for the dispense of digital information among a plurality of entities, including the owner of the ATM, the source of the digital information, and/or a licensing organization. This distribution may be performed for each user transaction or may be performed on a periodic basis. When the distribution is performed periodically, the ATM may be operative to calculate an amount of value that corresponds to licensing fees for digital information that is downloaded or dispensed by the ATM during a time period. An amount of value equal to this calculated amount may then be transferred from an account associated with the ATM such as the operator thereof to the source(s) of the digital information and/or to licensing organizations.

When the digital information requires copy protection features, the ATM may be further operative to include or activate a copy protection feature responsive to the type of license being purchased by the user. For example, if the ATM dispenses SDMI or Windows Media sound recording files, movies or other digital content, the ATM may be operative to configure the files to limit where and how long, or the number of times files can be played as well as whether duplication of transfer of the files or portions thereof, is allowed.

DETAILED DESCRIPTION OF EXEMPLARY EMBODIMENTS

Figure 1:
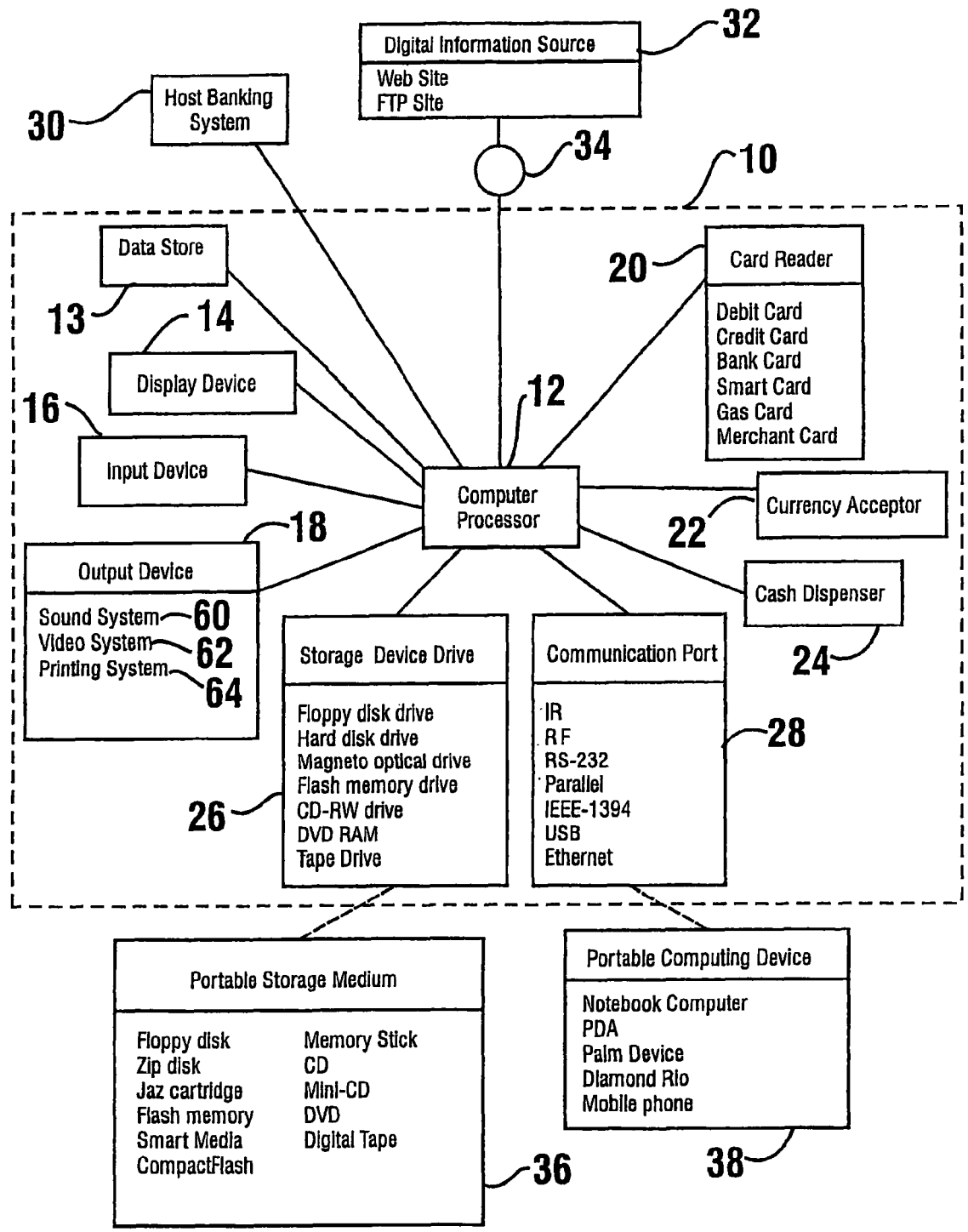
FIG. 1 is a schematic view representative of an exemplary embodiment of an automated banking machine and system that is operative to dispense digital information.

Automated banking machines are known in the prior art. A common type of automated banking machine is an automated teller machine (ATM). ATMs are typically operative to perform banking transactions such as dispensing cash, transferring value between banking accounts, or accepting deposits. Many times ATMs are located in retail or service facilities such as stores, gas stations, restaurants, casinos and bars. The owners of these facilities often generate income from the ATMs through service fees on transactions performed with the ATM. For example if a user withdraws an amount of cash from the ATM, the user may be charged a small transaction fee.

Methods for the digital recording of sound are also known. Such digital recordings are typically distributed on compact disks (CD) for playback on a CD player. As sound systems have become a standard feature of any new personal computers, digital sound recordings are also being distributed as computer files. Common formats for sound computer files include WAV (Waveform Audio File Format) and MP3 (MPEG-1 Audio Layer-3). To play such files, computer systems can employ a sound file player application such as the Windows Media Player. Sound file player applications read the digital sound files and output corresponding music through the sound card and speakers of the computer system.

Digital sound recordings may also be copied directly from an audio CD through a process called "ripping." Essentially ripping refers to the reading of the digital information that represents audio on the CD and saving the information in a computer readable sound file. Different formats of sound files have different characteristics. For example WAV files are typically uncompressed digital versions of sampled sound. MP3 files are typically created by compressing a sound sequence into a very small file (about one-twelfth the size of a corresponding WAV file). However, MP3 files are "lossy" meaning that the compression algorithms remove digital information that most people cannot hear or cannot distinguish from other sounds. If a high sampling rate is used to generate the MP3 files, the sound quality is only slightly inferior to that of the original audio file. However, the advantage of the smaller size of the MP3 files is significant. These advantages include the ability to store more hours of sound recordings per amount of space in physical storage mediums such as, for example, hard disks, RAM, and flash memory cards. Also, the smaller size of MP3 files enables them to be downloaded much faster through a network such as the Internet.

Numerous web sites on the Internet offer digital sound files such as MP3 files for downloading to a personal computer. Also as a result of the popularity of digital sound files, portable computer systems have been developed such as the Apple iPod™, Microsoft Zune™ and the Diamond RIO which are specifically designed to load and play sound recording files. Cell phones are also capable of downloading and playing music files and other forms of digital content.

Unfortunately, the technology associated with creating MP3 files from a CD and downloading MP3 files from web sites has resulted in a significant amount of music piracy and lost revenues for artists and music recording companies. Anyone with a home PC can generate an unlimited number of copies of digital sound files. By placing such pirated files on an Internet web site, unlimited distribution of pirated sound files is possible.

To deter copyright infringement and unrestricted piracy of digital sound recordings, the music industry has promoted digital rights management initiatives. One such initiative was an alternative file format for storing digital recordings called SDMI (Secure Digital Music Initiative). The SDMI specification for sound files offers similar compression characteristics as the MP3 file format; however, SDMI is designed to have built in copyright protection features which limit the playback and duplication of the files. In addition Microsoft has developed an alternative specification for compressing and copyright protecting sound files called Windows Media. Other digital rights management approaches have also been developed to limit use of digital content.

However, the popularity of MP3 files coupled with unlimited sound file piracy may significantly decrease the revenue that recording labels and artists generate from the sale of music and other forms of audio.

Distribution of sound recordings from the Internet makes it much easier for an individual artist to reach a mass audience for their work without a recording label. As a result the variety of music that is available over the Internet is exploding. Many of the titles can be downloaded without a fee. Unfortunately much of the music that has no fee is low quality, amateurish, and not very desirable. If the artist is relatively unknown, it is very difficult to get users to download music for a fee. This is because most individuals are hesitant to pay for downloaded music or other content files before being familiar with the artist.

If the music is given away on a no-fee basis or even a low-fee preview basis, it may be difficult to generate any income from the music. Once the MP3 or other digital version of the music is downloaded, the file can be played, copied, and distributed an unlimited number of times without generating income for the artist.

To take advantage of the benefits of playing sound recording files rather than CDs or cassettes, a user must have a PC. Although the cost of a personal computer has dramatically decreased over the last two decades, computers are still significantly more expensive than a CD player. Portable sound file players such as the iPod, Zune and Diamond RIO are operative to play music independently from a PC; however, they still must be connected to a PC at some point to upload a new set of files. Cell phones which can connect to the Internet may reduce the inconveniences associated with dedicated player devices. However, cell phone devices with numerous functions can prove difficult to operate and can be more expensive to purchase and use. The methods for delivery of digital content such as audio, visual, print and other media as well as user specific graphics, text or other content may also have drawbacks.

Referring now to the drawings and particularly to FIG. 1, there is shown therein a schematic view of an automated banking machine 10 of an exemplary embodiment which comprises an ATM 10. The ATM 10 includes at least one computer processor 12 that is operatively programmed to enable the ATM to perform at least one financial transaction such as the dispense of cash. It should be understood that embodiments may include multiple processors and that even though reference may be made to a single processor, multiple processor arrangements, and/or arrangements including multiple data stores in operative connection with such processors, are encompassed by the description of a processor. The exemplary computer processor 12 is also operatively programmed to enable the ATM to dispense digital content which is alternatively referred to herein as digital information. To perform these functions the ATM further includes in operative connection with the computer processor 12, at least one data store 13, a display device 14, at least one input device 16, at least one output device 18, a card reader 20 which also serves as an input device, and a cash dispenser 24. The exemplary card reader may include a card reader that reads indicia corresponding to a user and/or a financial account encoded on a magnetic stripe. Other embodiments may include readers that read data encoded on memory devices that is communicated via RF or other contactless communication. The ATM 10 is further operative to communicate with at least one financial transaction processing computer which is operative to carry out financial transfers which in this example is host banking system 30. Alternatively the computer for accomplishing financial transfers may include a credit card transaction processing computer. ATM 10 also is enabled to communicate with at least one digital information source 32. In the exemplary embodiment the ATM 10 is operative to download digital information from the digital information source 32 through a network 34. Network 34 may be one or more private networks or may include public networks such as the Internet.

It should be understood that the ATM 10 and system are exemplary and in other embodiments automated transaction machines may include other or additional devices and may operate in other types of systems. For example, embodiments may include in operative connection with the computer processor 12, a currency acceptor 22, a data store including a storage device drive 26, and a communication port 28 which serves as an output device. The storage device drive 26 serves as a local data store and enables the computer processor to dispense digital information to a portable storage medium 36. The communication port 28 enables the computer processor to cause the dispense of digital information to a portable computing device 38. Of course other exemplary embodiments may not include some of such devices, and/or may include other or additional devices.

Figure 2:
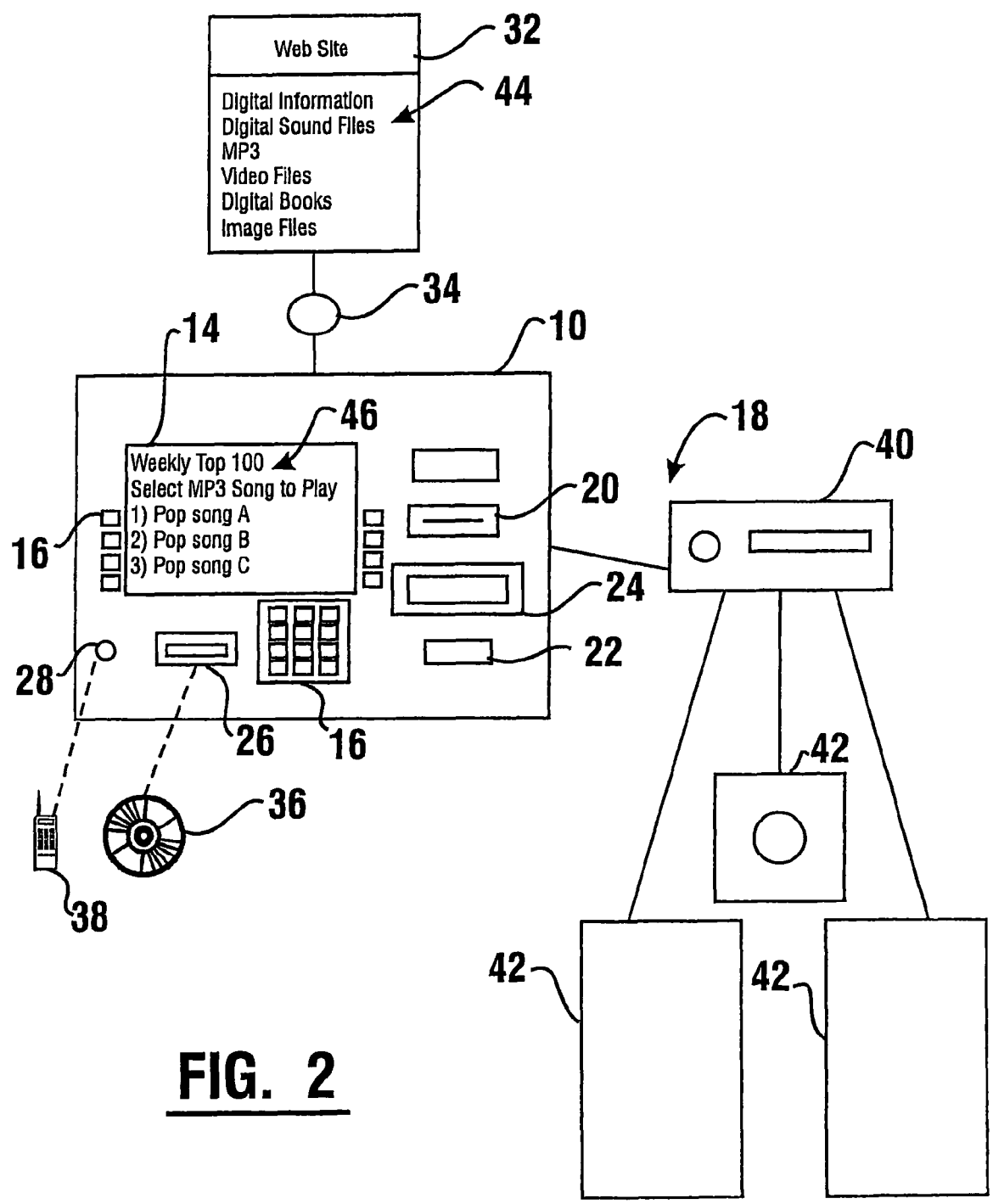
FIG. 2 is a schematic view representative of an exemplary embodiment of an automated banking machine and system that is operative to dispense digital sound recordings.

FIG. 2 schematically shows an exemplary embodiment of the ATM 10 that is operative to dispense both cash and digital content comprising sound recordings such as music and songs. However, it is to be understood that exemplary embodiments also encompass the dispensing of other types of digital information including digital representations of images, books, software, audiovisual works, movies, TV shows, magazines, newspapers, games, compilations, instructional materials, data files, educational content, databases, account statements, loan applications, investment advice, company annual reports, discount coupons, promotional offers, passwords, digital signatures, gaming tickets, and other types of digital content that may be delivered in a digital format.

Exemplary ATM 10 includes a display device 14 such as a CRT monitor or LCD display. The display device is operative responsive to the processor to output user interface indicia 46. The user interface indicia may include instructional outputs for operating the ATM as well as content indicia which are representative of the portions of digital information that may be dispensed from the ATM for a fee. In some embodiments the content indicia may include listings of songs, movies, books or other portions of the digital content which a user may select to have delivered. Exemplary embodiments may also include graphical representations regarding the information, such as pictures of the artist or CD liner in the case of music files. Audio and/or visual outputs may also be provided to identify, and in some cases enable the user to sample the available information.

Exemplary ATM 10 also includes at least one input device 16 such as a keypad and selection buttons. The input device(s) enable the user to enter operation inputs such as a personal information number (PIN) corresponding to an account, an amount of cash to withdraw, or a selection of a particular digital sound recording or other type or portion of the available digital content to dispense. Although this described embodiment includes function keys and a keypad, alternative embodiments may use other or additional types of input devices for entering information, such as a touch screen device, a speech recognition system, a track ball or communication with a separate device such as by RF communication with a cell phone, personal digital assistant or handheld or portable drive.

The exemplary ATM 10 also includes a cash dispenser 24 and a card reader 20. The card reader 20 is operative to read indicia corresponding to account information from a user's card. The card may be a bank card, credit card, debit card, gas card, merchant card, smart card, or other medium that is operative to store account data and/or other information which may be used to identify a user and/or their financial accounts. In other embodiments the ATM may include a biometric type reading device which may identify the user by a characteristic thereof. Such biometric reading devices may include for example a fingerprint reader, iris scanner, retina scanner, voice recognition device, hand scanner, facial recognition reader and/or software or other device. The exemplary ATM 10 is operative to dispense a selected amount of cash to the user from the cash dispenser 24, and to debit the account of the user through communication with a financial transaction computer such as a host banking system. The exemplary ATM 10 is also operative to debit user fees from the account for dispensing digital information from the ATM as well.

In alternative embodiments, the ATM may also include at least one currency accepting device 22. For users who do not wish to use an account to pay for the dispense of digital information, the ATM is operative to receive the user fees in the form of cash such as bills and/or coin, using the currency accepting device 22.

In an exemplary embodiment, the digital information dispensed by the ATM 10 includes digital sound recording files 44. Examples of digital sound recording files include MP3 files, WAV files, SDMI files, and Windows Media files. Typically each file corresponds to an individual music selection or song. However, sound files may correspond to any collection of sounds of any type and length. Other examples of sound recording files include compilations of songs such as are found on music CDs and spoken textual material corresponding to news articles, stories, speeches, investment advice, personal account information, educational materials and books.

In an exemplary embodiment, the ATM 10 acquires sound files to dispense from at least one remote digital information source 32. The source 32 may include a web site or FTP site on the Internet, or sources in other public or private networks. The exemplary ATM 10 is operative to periodically download a plurality of sound files that match certain customizable programmed criteria. The ATM may also download corresponding graphics or video files associated with the sound files. These downloaded files may be stored locally at the ATM in a local content data store 13 such as a hard drive. The ATM 10 is operative to display or output graphical, textual and/or audio content indicia representative of these sound files with the display device 14. A user of the ATM 10 may then provide one or more inputs to select and/or dispense one or more of these sound files.

The ATM may be programmably configured with different types of downloading criteria. For example, if the ATM is located in a dance club, the downloading criteria may be configured to have the ATM periodically download the sound files that correspond to the top 100 most popular dance songs for the month. If the ATM is located in a book store, the ATM may be configured to periodically download sound files representative of the best-selling fiction and nonfiction books for the month. If the ATM is located in a financial institution the sound files could include helpful information about available financial products such as loans and investments. Of course, this is merely exemplary.

In exemplary embodiments if the data store 13 does not have already stored therein the sound file that a user desires, the exemplary ATM is further operative to have the user enter a selection input corresponding to the desired sound file such as a title or the name of an artist or group. The ATM is then operative in accordance with its programming to query one or more remote content data stores for the requested sound file(s). A message is returned to the ATM which is operative to cause the processor to generate a listing of matching sound files which is displayed on the display device 14 of the ATM 10. In a response to one or more dispense inputs from the customer, and in some embodiments in exchange for a fee, the ATM 10 is then operative to download and dispense one or more of the matching sound files from an output device.

In some embodiments in which a network connection such as an Internet connection is not available or is not always used, the ATM may be operative to acquire digital content files from portable storage mediums such as DVDs, CDs or solid state memory. Such files may then be copied or ripped from the storage media and saved locally to the data store 13 in the machine.

The exemplary ATM may be operative to dispense digital information in a plurality of different ways depending on the type of digital information. For example the ATM described in connection with FIG. 2 further includes an output device 18 that includes a sound system 60. The sound system 60 includes a sound signal amplifier 40 with a plurality of speakers 42. The ATM 10 is operative to output though the sound system 60, analog or digital signals that correspond to selected digital sound recording files. The signal amplifier 40 is operative to output sound through the speakers 42 that corresponds to the sound file signals. Such an ATM may then function as a fee-based digital music player or jukebox. For restaurants, bars, and other facilities that offer music, the exemplary embodiment offers the ability to generate user fees for both the dispensing of cash and the dispensing of audible music.

In some embodiments an ATM may include the capability of outputting digital information in the form of both a visual representation of text corresponding to music lyrics and the audio output concurrently. This may be done for purposes of using the ATM itself or the connected equipment for purposes of karaoke or similar user entertainment. In still other embodiments the ATM may be connected through a network to provide visual and audio communication with one or more remote locations. This might be done using the principles described in U.S. Pat. No. 6,583,813 the disclosure of which is incorporated herein by reference in its entirety. For example in some embodiments a remote entertainer such as a DJ or VJ may communicate with patrons in the establishment to provide entertainment and coordinate patron participation in activities, coordinate karaoke, play requests, etc. Further in some embodiments the remote entertainer may communicate and coordinate entertainment at multiple entertainment facilities from a single location. In still other embodiments the entertainer may operate to control the communications so that patrons in one facility may view and/or communicate with patrons in another facility. In this way the remote entertainer may facilitate games, contests or other activities between patrons in different facilities. Of course these approaches are exemplary and in other embodiments other approaches may be used.

For other forms of digital information that is visual, such as text, documents, images or video for example, the ATM may be operative to output such digital content either through the display device 14 of the ATM 10 or through an output device 18 that includes a video system 62 or a printing system 64. A video system may include one or more monitors, TVs, speakers, LCD displays, or projection TV. Some embodiments may include multiple output devices for outputting multiple forms of digital information concurrently. A printing system 64 may include a monochrome or color printer capable of outputting documents and/or photo quality prints of images or other graphics.

If multiple sound files or other forms of digital information have been selected for output through the output device, exemplary embodiments may be operative to sequentially output each song, video or other content either in the order the digital information was selected, or in other orders, including alphabetical by title of song, artist, album, style, or in a random order.

Alternative embodiments may also dispense digital information such as sound or video files, to other storage mediums. For example the ATM 10 may include a storage device drive 26 such as a CD-R or CD-RW drive, a DVD read/write device or a USB port, which is operative to accept a portable storage medium 36 such as a write-once or rewriteable CD, a DVD or other portable memory device. For a fee the ATM may be programmed to dispense the sound file by writing a copy of the sound or other file on a user supplied CD or other storage media or device. Alternatively, the ATM may include a supply of blank CDs, DVDs or other media, and may copy the file onto the media and deliver it to the user. Examples of other types of storage device drives that may be used with some embodiments may include portable hard drive readers such as an Iomega Jaz® drive; magneto optical drives such as an Iomega Zip® drive; flash memory drives for writing to flash memory devices such as CompactFlash and Sony Memory Stick®; DVD-R, DVD-RW, and DVD-RAM drives, Mini-CD drives, thumb drives and digital tape drives.

Alternative embodiments may dispense digital information such as graphics, text, image, sound or video files, through an output device which includes a communication port 18 directly to a portable computing device. Examples of suitable communication ports 18 include a Universal Serial Bus (USB) port, a serial RS-232 port, parallel port, an infrared (IR) port, a radio frequency (RF) port such as Bluetooth, an IEEE-1394 port, or a network port such as a wired or wireless Ethernet connection. When a portable computing device such as an iPod, Zune or Diamond Rio is connected to the port 18, the ATM may be operative for a fee to download digital content files to the device. Examples of other types of portable computing devices that may receive dispensed digital information such as sound, video or other content files include a portable computer such as a notebook computer, a personal digital assistant (PDA) and a mobile phone, such as a cell phone (Apple iPhone, for example).

Alternative embodiments may be operative to dispense digital information to a user through the Internet by e-mail or FTP for example. In such embodiments the user may select the information through inputs to the ATM 10. The ATM would prompt the user to input through at least one input device at least one input or selection corresponding to an e-mail, FTP or other network delivery address. The ATM would then be operative through an output device such as a suitable network interface, to e-mail or FTP the selected digital information to the user, rather than dispensing the digital information through output devices, to a portable storage medium or to a computing device adjacent the ATM. Alternatively the ATM may send one or more messages through one or more networks to a remote computer, which messages cause the remote computer to send the selected digital content to the network address. For example some embodiments may operate using the principles disclosed in U.S. patent application Ser. No. 09/193,624 filed Nov. 17, 1998 the disclosure of which is incorporated herein by reference in its entirety.

In exemplary embodiments, the ATM user may operate the ATM to cause digital information to be sent to a selected network address associated with a computing device utilized by the user. In some embodiments this could include for example an ATM user's PC, cell phone or other device or system associated with the user. In some embodiments the network address for the delivery of digital information may be input by the user to the ATM, such as through manual inputs or by communication with a portable computing device which has address data stored therein. Alternatively, the network delivery address may be linked in one or more data stores of computers in connection with the ATM, with information that can be read from a user's card, such as a user name or account number. In some embodiments users can have selected digital information corresponding to music, movies and other content sent to their home PC, cell phone, or to another address from which the digital information can be selectively retrieved or output, such as a storage location on a local or distributed system. This could include a designated storage address for the user with a phone service or cable television provider. Alternatively the network address may correspond to the network address associated with a user's portable computing device such as a PDA or cell phone. Thus for example content such as account status information, receipts for transactions conducted by the user at the ATM (or elsewhere), copies of cancelled checks, documentation related to loans, investments, annual reports, 1099-INT forms, or other data or records related to transactions may be available on the user's computing device. In addition in some alternative embodiments the digital content may include discount coupons, gift certificates, tickets, access codes or other items a user may use to access, obtain or receive benefits related to goods or services. For example the access codes may be used to access a facility such as a private nightclub, entertainment venue, merchandising facility, transportation facility or other area of a building or area. Access codes in other embodiments may be used to operate a machine such as a gaming machine, exercise machine, vehicle or other type machine. In still some other embodiments the digital information may be in a format from which it can be printed by a user from a printer attached to their computing device. In other embodiments the digital information may be transferred electronically by the user from their computing device to a third party. This might include for example, digital coupons, access codes, or tickets that are transferred from a portable phone via RF, IR or other communications method to a merchant system for redemption. Of course, these approaches are exemplary and in other embodiments other approaches may be used.

Figure 3:
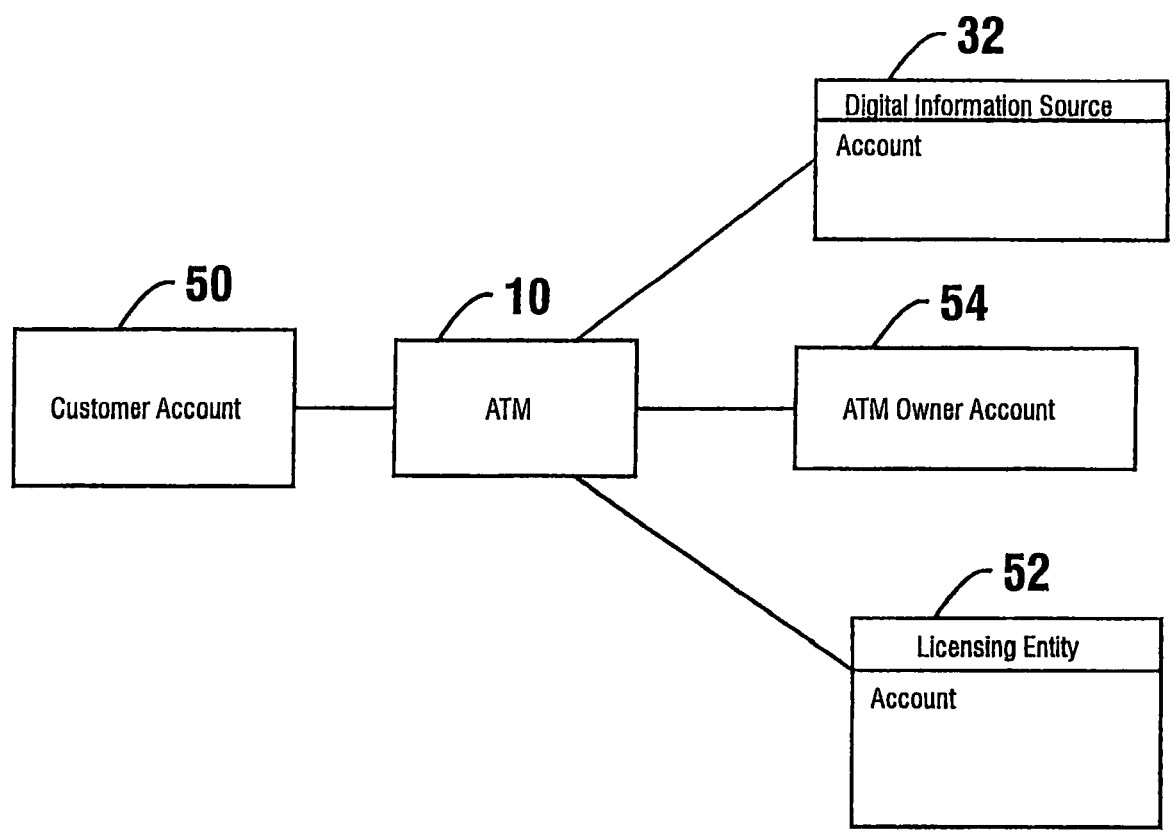
FIG. 3 is a schematic view representative of the distribution of transaction fees from digital information dispensed by an automated banking machine.

FIG. 3 shows a schematic view representative of accounts that are accessed by the exemplary ATM 10 for distributing user fees. Because the exemplary ATM 10 is in operative connection with a host banking system, ATM 10 is enabled to deduct a user fee from an account of the user in exchange for the dispense of digital information. The exemplary embodiment of the ATM 10 operates by reading an account number from a card inserted by a user into the card reader 20. The account number includes data representative of the institution where the user's account is held. Examples of cards that are operative for use with some embodiments include credit cards, bank cards, debit cards, merchant cards, smart cards, or any other portable medium that can store account or user information and/or data representative of stored value. The exemplary ATM 10 is operative to communicate with a financial transaction computer which includes or which can communicate with, a host banking system which can validate a user inputted PIN and authorize a transaction requested by the user at the ATM. If the PIN is valid and the transaction authorized, the message(s) sent by ATM 10 is further operative to cause the host banking system to debit user fees from the user's account corresponding to the requested dispense of cash and/or the requested dispense of digital information. Transaction fees or other charges for the convenience of using the machine or system may also be charged to the user's account. Alternatively as previously discussed, embodiments may identify users by biometric information. The biometric data from the user may then be used by a local or remote computer to identify the user and/or their associated account information.

The dispensing of most digital information is limited by the copyright owner. Typically the copyright owner requires a fee or royalty to copy, display, publicly perform or otherwise deliver the work. The amount of the fee may vary depending on how the work is authorized to be used. For example if the work is a sound recording, the fee to play the sound file one time in a restaurant may be much less than the fee to dispense the sound file to a portable storage medium which may be duplicated an unlimited number of times. Consequently, an exemplary embodiment is operative to track how digital information is dispensed and to transfer corresponding licensing fees to a licensing entity, a digital information source and/or other entities authorized to receive payment. Likewise stored information concerning the nature, location, size, contract status or other information concerning the establishment in which the particular ATM is located may be used to determine the fee. For example the fee to play a music file in a small restaurant may be less than in a large dance club. Similar principles may be applied to charging for other types of audio files, documents, images, videos, audiovisual files, individualized investment or other financial advice and pay-per-view type events.

The exemplary ATM 10 may be operative to debit a user fee from the user's account 50 for each dispense of digital information. The user fees may be transferred to a common banking account 54 of the operator of the ATM 10. Transfers of user fees may occur either immediately with each dispense and/or may occur periodically with the ATM 10 transferring data concerning multiple charges made to credit cards of various users to a financial transaction computer, such as a settlement host for example, which is operative to credit and debit accounts of the appropriate entities.

Licensing fees for downloading digital information from a digital information source may be transferred in a similar manner. The ATM 10 may generate messages or may include data in messages operative to cause a financial transaction computer to transfer a licensing fee from the account 54 that corresponds to the operator of the ATM 10, to an account of the digital information source 32. Such a transfer may be performed through the host banking system or through another transaction switch or through interaction of one or more financial transaction computers. Such transfers may occur with each download or may occur periodically for a batch of downloads which have occurred during a prior time period.

In an alternative embodiment, the ATM 10 is configured with inputs which include a terminal identifying UserID and a password for use when connecting through one or more networks to the digital information source 32. The UserID and password enable the ATM 10 to access the digital information source 32 and to download digital information. The digital information source 32 monitors all downloads that correspond to the UserID and periodically charges the account 54 that corresponds to the operator of the ATM. Alternatively for some types of digital information, the charge may be assessed against an account of the establishment where the ATM is located or an account of the operator of the establishment. This may be appropriate in cases where the use associated with the digital information, as indicated by the transaction messages received from the ATM and/or based on stored data, is a public display or performance of the work in the establishment. Of course this approach is exemplary and other approaches may be used.

Once digital information has been downloaded to the data store 13 of the ATM 10, the copyright owner of the digital information may require that a licensing fee be paid with each dispense of the digital information to a user or upon each public display or performance. The ATM 10 or other connected computer is operative to keep records of each dispense of digital content and the character of dispense that is made. The exemplary ATM is further operative to transfer licensing fees associated with each dispense to an account of the digital information source 32 or another licensing entity 52 through the financial transaction computer. This transfer may be done with each dispense or periodically for a batch of dispenses.

In an alternative exemplary embodiment, the ATM 10 may be operative to transfer dispense records to the digital information source or the licensing entity through the Internet or other network. The digital information source 32 or licensing entity 52 may then debit or charge the licensing fees from an account that corresponds to the user, the operator of the ATM, the operator of the establishment or other appropriate entity.

For digital information that includes copy protection features or other technological measure to limit reproduction, access or use of the copyrighted work, the ATM 10 may be further operative to configure or incorporate the protection features and charge a user fee that corresponds to the copy or other protection features which are included. For example ATM 10 may be enabled to have the user select licensing features of a song file such as unlimited or restricted duplication, expiration dates, or other features of the sound file that affect the reproduction or use of the sound file. For example, the protection features used in some embodiments may restrict reproduction of the digital content so that it may only be played in the portable computing device to which it is initially delivered. Other features may restrict reproduction by preventing the digital content from being transferred from or otherwise reproduced in digital form from the media or device on which it is initially delivered. Other features may restrict reproduction by limiting the use of the digital content to a particular time period or to a particular number of plays. Of course additional or alternative approaches may be used depending on the system and the digital content involved. The ATM 10 may be operative to charge the user a corresponding user fee based on the type of protection features selected. The ATM may also be operative to cause the corresponding licensing or other fee to be paid to the source of the digital information or a licensing entity.

Alternative embodiments may be used in connection with systems which include stored information concerning particular users. Such systems may be used to correlate the identity of the user with marketing or customer preference data. Such information may include particular categories of music, videos, books or other materials or products that can be provided and/or that are of interest to the particular user. The ATM may operate to automatically give the user options for selections tailored to their associated preference information. Alternatively such information may be used to automatically provide the user with digital files, visual or audio outputs or other outputs whenever the user operates an ATM connected to the system. For example when the ATM is operated as a jukebox, the ATM may operate to automatically display indicia corresponding to favorite artists or songs, or to output one or more of the user's favorite songs.

In certain embodiments it may not be desirable for a user to access their financial account each time a relatively small charge for digital information is assessed to the user. In such systems the system may be configured so that the user is required to make a "minimum purchase." This amount may be a charge reasonably sufficient to offset the costs of accessing the account, for example $10 or $20. This amount would then be credited to a content prepay account associated with the user. A prepay account record indicating a credit associated with the user or their account would then be stored in one or more data stores. This credit information may be stored locally on a smart card or other item, at the ATM or remotely in a computer such as a financial transaction computer which can be accessed from the ATM. For example in some embodiments the amount may be credited to a licensing or other organization. Alternatively, a financial transaction computer may debit the prepay account of the user as it is used and route payments to the appropriate entities. The amount of value associated with the prepay account may then be reduced each time the user receives a delivery of digital content until the account is exhausted. Such a system may be advantageously used where the fees involved in each digital file transaction are small, such as the cost or playing sound files. Such a system also provides the system operator, licensing entity, or other entity the benefit of the "float" on the allocated funds.

To discourage or limit the unauthorized reproduction of digital information that may be dispensed, exemplary embodiments may be operatively programmed to modify features of the digital information before it is delivered for reproduction on a portable medium and computing device. For example with digital sound files, the processor in the ATM comprises a reproduction device that may embed a digital code or certificate in the sound file that is reproduced on the user's portable digital sound player or other personal computing device. Such a certificate may further include an encrypted digital signature that can be used to detect unauthorized alterations of the file.

The portable sound player would only be operative to play the sound file if the digital certificate corresponds to a unique code or certificate associated with the portable sound player. Also the portable sound player would only be operative to play the sound file if the digital signature indicates that the sound file is authentic. Such features would limit playback of the file to the user's personal sound player. The sound file would be inoperative on another personal sound playing device that is associated with a different certificate or code. Of course the same principles may be used with files that are downloaded to the ATM itself for storage in the local data store, when the files are only to be played through use of the ATM and not transferred to other devices. Of course the use of such principles with digital information comprising sound files is exemplary and such principles may also be applied to other types of digital information and the computing devices to which they are delivered.

In alternative embodiments the ATM may be operatively programmed to have the user register with a licensing entity for the digital content prior to dispensing digital content for the first time. During the registration process the user would be associated with a unique license code that may also be used when purchasing digital content in the future. The ATM may then be operative to embed the license code in each file that is dispensed for the user. The next time the user wishes to purchase digital information, the ATM may then be operatively programmed to accept the input of the license code from the user.

For example the license code may be manually input with the input device 16, read from a card with the card reader device 24, downloaded from the user's portable computing device 38, retrieved from another source and/or correlated with other data concerning the user. The ATM would then be operative to validate the license code by communicating with the licensing entity. If the license code is valid and/or is in good standing, the ATM would be operative to dispense additional digital information with the embedded license code of the user. Such a unique license code may be generated by the licensing organization, or may correspond to the previously described digital code or certificate associated with the user's computing device.

These described methods of copy and/or use protection of the dispensed digital information may be further associated with a subscription service or club. For example during the previously described registration process the ATM may prompt the user to sign up for a digital information service that for a monthly fee enables the user to dispense a certain amount and/or type of digital information. For example the service may correspond to the dispensing of music files or digital book text files. Each month the user would be entitled to dispense a certain amount of these files from the ATM for a discount club rate fee or for no additional fee per dispense transaction.

When the user first signs up for the service, the ATM may be further operative to enable the user to associate payment of the service or club fees to an account of the user for automatic debit of the monthly club dues or dispense fees from the user's account. Such automatic payment information may be acquired by reading account information from a user's credit card or banking card with the card reader device 20 of the ATM.

An alternative exemplary embodiment may be used to retrieve digital information previously associated with a user from a processor of the digital information. For example the exemplary ATM may be in operative connection with a photographic film processor. The user may for example input with an input device 16 of the ATM a processing number, code or other identification value associated with photographic film being developed and digitally scanned by the film processor. The exemplary ATM is operative to download digital images of the user's developed film from the processor as image files which correspond to the inputted processing number. The ATM is further operative to display the images and enable the user to select one or more of the images for printing to the printing system 64. The ATM may further enable the user to dispense the images to a physical medium and/or portable computing device of the user as previously described.

Exemplary embodiments of this described embodiment of the ATM may further enable the user to crop, zoom, and/or perform other imaging processing manipulations on the images prior to printing or dispensing. The exemplary ATM may be operative to charge fees to an account of a user or accept cash from the user for the services of printing and/or dispensing the images. A portion of the fees may further be transferred by the ATM to the film processor.

In a further alternative exemplary embodiment, the ATM may accept the upload of digital images or other digital content from a portable storage medium, digital camera, or other device of the user. The exemplary ATM may then enable the user to selectively print, for a fee, individual images or other uploaded digital content with the printing system of the ATM.

Embodiments may also include features described in U.S. Pat. Nos. 7,469,823; 7,416,112; 7,416,779; and/or 7,424,972 the disclosures of each of which are incorporated herein by references in their entirety.

The processor in ATM 10 operates to perform processes described herein responsive to software stored in one or more data stores, such as data store 13. The software stored in data store 13 is loaded therein from one or more forms of programming media. Such programming media may include any article comprising media from which computer executable instructions can be copied such as one or more CDs, DVDs, diskettes, hard drives, tapes, flash memory, solid state memory or other items.

The exemplary embodiments may find applicability to numerous types of situations and may be used to facilitate the tracking of transactions in the entertainment, education, gaming, investment, merchandising and banking industries.

Thus the system and method for dispensing digital information of the exemplary embodiments achieve at least one of the above stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function will be construed as encompassing any means known to those skilled in the art to be capable of performing the recited function, and will not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. Apparatus comprising:
at least one computer associated with an automated banking machine of a banking system, wherein the machine includes at least one data reader and at least one user input device,
wherein the at least one computer is operable to cause the at least one data reader to read user data usable to identify a financial account associated with a user of the machine,
wherein the at least one computer is operable responsive at least in part to at least one user selection input to the at least one user input device, to receive user selection of a purchasable digital content file which comprises either
an audio file including at least one of music or a speaking voice, or
an audiovisual file including at least one of a movie or a video,
wherein the at least one computer is operable responsive at least in part to the user selection received, to cause user payment for the digital content file to be associated with the financial account,
wherein the at least one computer is operable responsive at least in part to the user selection received, to cause the digital content file to be sent to a network address of a personal device of the user, wherein the personal device comprises either a mobile phone or a PC.

2. The apparatus according to claim 1 wherein the personal device comprises the mobile phone.

3. The apparatus according to claim 2 wherein the digital content file comprises the audio file.

4. The apparatus according to claim 2 wherein the digital content file comprises the audiovisual file.

5. The apparatus according to claim 1 wherein the personal device comprises the PC.

6. The apparatus according to claim 5 wherein the digital content file comprises the audio file.

7. The apparatus according to claim 5 wherein the digital content file comprises the audiovisual file.

8. The apparatus according to claim 5 wherein the PC comprises a home PC.

9. The apparatus according to claim 1 wherein the machine includes a wireless output port, wherein the at least one computer is also operable responsive at least in part to user selection received, to cause the digital content file to be output through the wireless output port in a manner that enables the portable personal device to wirelessly receive the digital content file only while the portable personal device is located adjacent the machine.

10. The apparatus according to claim 9 wherein the portable personal device comprises the mobile phone.

11. The apparatus according to claim 1 wherein the at least one computer is operable to cause a value associated with the digital content file to be transferred from the financial account to an account associated with a provider of the digital content file.

12. The apparatus according to claim 1 wherein the machine includes a cash dispenser in operative connection with the at least one computer, wherein the at least one computer is operable to cause cash to be dispensed from the machine through operation of the cash dispenser.

13. Apparatus comprising:
- at least one computer associated with an automated banking machine of a banking system, wherein the machine includes at least one data reader, at least one user input device, and a wireless output port,
    - wherein the at least one computer is operable to cause the at least one data reader to read user data usable to identify a financial account associated with a user of the machine,
    - wherein the at least one computer is operable responsive at least in part to at least one user selection input to the at least one user input device, to receive user selection of a purchasable user access to at least one of an event and a facility,
    - wherein the at least one computer is operable responsive at least in part to the user selection received, to cause user payment for the user access to be associated with the financial account,
    - wherein the at least one computer is operable responsive at least in part to the user selection received, to cause a digital access code corresponding to the user access to be output through the wireless output port in a manner that enables the user to wirelessly receive the digital access code into a portable personal device located adjacent the machine,
    - wherein the digital access code allows the user access to the at least one of the event and the facility.

14. The apparatus according to claim 13 wherein the portable personal device comprises a mobile phone, wherein the at least one computer is operable to cause the digital access code to be output in a manner that enables the mobile phone to wirelessly receive the digital access code.

15. The apparatus according to claim 14 wherein the digital access code comprises a digital ticket.

16. The apparatus according to claim 15 wherein the at least one computer is operable to cause the digital access code to be output in a manner that enables the mobile phone to subsequently electronically transfer at least a portion of the received digital ticket.

17. The apparatus according to claim 13 wherein the at least one computer is operable to cause a value associated with the digital access code to be transferred from the financial account to an account associated with a provider of the digital access code.

18. The apparatus according to claim 13 wherein the at least one computer is also operable responsive at least in part to user selection received, to cause the digital access code to be sent to a network address of a personal device of the user, wherein the personal device comprises either a mobile phone or a PC.

19. A method comprising:
- (a) operating at least one computer associated with an automated banking machine including at least one reader, to cause the machine during a transaction involving a machine user associated with a mobile phone, to read user data usable to identify a financial account of the user;
- (b) subsequent to (a), operating the at least one computer during the transaction to cause the machine to receive through at least one user input device of the machine, user selection of purchasable digital data of monetary value;
- (c) subsequent to (b), operating the at least one computer during the transaction to cause user payment for the user selection in (b), to be associated with the financial account; and
- (d) subsequent to (b), operating the at least one computer to cause the digital data to be wirelessly communicated to the mobile phone.

20. The method according to claim 19 wherein the machine includes a wireless output port, wherein in (d) the at least one computer causes the digital data to be output through the wireless output port in a manner that enables the mobile phone to receive the digital data only while the mobile phone is located adjacent the machine.

* * * * *